US005237539A

United States Patent [19]
Selman

[11] Patent Number: 5,237,539
[45] Date of Patent: Aug. 17, 1993

[54] SYSTEM AND METHOD FOR PROCESSING AND DISPLAYING WELL LOGGING DATA DURING DRILLING

[76] Inventor: Thomas H. Selman, 11717 W. County Rd. 52, Midland, Tex. 79702

[21] Appl. No.: 804,974

[22] Filed: Dec. 11, 1991

[51] Int. Cl.$^5$ ............................................... G01V 1/40
[52] U.S. Cl. ....................................... 367/69; 367/25; 364/422
[58] Field of Search .................... 364/422; 367/25, 33, 367/68, 69; 73/151, 152

[56] References Cited

U.S. PATENT DOCUMENTS 4,414,651 11/1983 Buckner ................................. 367/27
4,616,321 10/1986 Chan .................................... 364/422

Primary Examiner—Ian J. Lobo
Attorney, Agent, or Firm—Robert C. Peterson

[57] ABSTRACT

A system and method for processing and displaying well log data that provides real time and lag time data combined into a format which can be graphically printed using a printer interface to a computer during the drilling of an oil and gas well. Preselected monitors provide real time data such as weight on bit, mud pump pressure, revolutions per minute of the rotary table (drill string) and the like and lag data such as units of gas, porosity, and percent cut fluor. The monitored information is then processed by a microprocessor into digital real time textual data curves (CRVs) and digital lag textual data (LAG). These data are then processed by a central processing unit (CPU) of the system that automatically merges the CRV and LAG data, checks for completeness of file curve (curve and lag data), picks scales or enters user input scale and normalizes the data based on scale value, enters user comments for display, like change of mud weight, change of scale. The merged and combined curve and lag data create what is referred to as "rock files" which can then be suitably displayed and/or printed. The system provides for an incremental printed or displayed log between preselected well elevations.

12 Claims, 8 Drawing Sheets

SYSTEM AND METHOD FOR PROCESSING AND DISPLAYING WELL LOGGING DATA DURING DRILLING

BACKGROUND OF THE INVENTION

This invention relates to oil and gas well logging and in particular provides a system for collecting real time and lag data concerning the drilling operations of an oil and gas well which are then processed and correlated to match real time data at a particular elevation with lag data and then displayed on a screen or printed out for immediate utilization in the drilling operation. The data are processed and correlated at preselected increments of well elevation and provide a geological-hydrocarbon log therefor.

The usual procedure in oil well drilling operations is to pump a drilling fluid or mud down through the drill stem and into the region around the drill bit during drilling. The mud then flows back up to the surface through the well bore outside the drill stem. The drilling mud is typically made up of clays and chemical additives in an oil or water base and performs several important functions. The drilling mud acts as a coolant and lubricates the drill bit during operation and it collects the drill bit cuttings and carries them back to the surface of the well. The drilling mud also serves to maintain a hydrostatic pressure to prevent pressurized gases from the earth from blowing out through the well during drilling. Further, the drilling mud will pick up and entrain gases present in the bottom of the well and deliver them to the surface along with the drill cuttings.

In oil and gas drilling operations a log of the operation is maintained that will permit the nature of the earth formation through which the drill bit is penetrating to be analyzed. The log is important because it enables the drilling operator to ascertain the presence of oil or gas in the formation being drilled and also the location or elevation of such oil or gas in the well. As part of this logging operation, samples of the drill cuttings from predetermined depths of the well are collected and analyzed. Generally, these samples will be collected to represent a desired interval of drilling, such as every ten feet of well drilled or every thirty feet drilled.

The logging of a well, frequently called mud logging because the information recorded and drill cuttings collected and analyzed are obtained from the drilling mud when it reaches the surface of the well, is generally done on a manual basis by a person called a "mud logger". This person, usually with a background in geology, collects and analyzes the well drill cuttings obtained from the drilling mud, monitors the gases released from the drilling mud, and enters the information collected in a well log along with information concerning the depth of the well where the cuttings and gas originated. Thus, the mud logger keeps track of the depth of the well generally through the use of a depth measuring device on the drilling rig called a geolograph and, having an approximate idea of the lag time, i.e., the time it takes mud at the bottom of the well to reach the top of the well, gained through occasional rough measurements of the lag time, estimates the depth from which a mud sample reaching the surface originated. All of the measurements and the measuring equipment require constant supervision so a logging operation generally involves two mud loggers each working alternate twelve hour shifts.

Lag time, the time required for drill bit cuttings and drill bit liberated formation gas entrained in the drilling mud to reach the surface after being drilled is generally determined every day or more, or every several hundred feet of drilling or more if desired by determining the amount of time required for a marker device, i.e., a small packet of carbide, multicolored rope, etc., to appear in the drilling fluid return line after being dropped into the drill pipe. This customary method is inaccurate in determining lag time because of the relative infrequency of the measurement and because a measurement based merely on time cannot accurately allow for changes in drilling fluid pump speed or for changing from one pump to another and the resulting change in pump output.

The measurement of lag is an important aspect in determining when samples of drill cuttings are to be collected for further examination. Samples, which comprise formation cuttings strained from the circulating drilling fluid as it reaches the surface of the well, are generally collected for microscopic examination at various increments such as every ten feet or so of well penetration. These samples are then representative of the drilling cuttings produced through that increment. Sample collection times are generally determined by adding the lag time to the time when samples are drilled. Therefore, if a sample of drill stem cuttings from a well depth of 3100 feet has been collected and it is desired to collect samples at ten foot intervals, the next sample should be collected when mud from a depth of 3110 feet reaches the surface. The mud logger would determine from drilling operations when the well was at a depth of 3110 feet, for example at 7:00 a.m., and then would add the lag time to determine when the drill bit cuttings should reach the surface and a sample be collected. If the lag time had been determined by measurement to be one-half hour, the mud logger would add one-half hour to the 7:00 a.m. time and know that the next sample of drill cuttings should be collected at 7:30 a.m. and, if collected at that time, the drill cuttings should be those cut between the 3100 and the 3110 depth level of the well. It follows if the lag time is not accurately determined, the samples of drill bit cuttings collected are not representative of the desired depth. Further, merely adding the approximately determined lag time to the time the well reaches the desired depth does not allow for compensation necessary if, during that time, the drilling fluid pump speed changes, the pump used to pump the fluid changes, or the drilling rig temporarily stops drilling.

A computerized system for keeping track of drilling mud sampling times to obtain drill cuttings is described in Larry J. Gunther. U.S. Pat. No. 4,860,836. This patent describes a computerized technique for determining sample collection times which continually monitors parameters necessary to determine the depth at which drilling mud reaching the surface of a well was injected into the well and thus aids in the sampling of the drilling mud when it reaches the earth's surface. Likewise, the system monitors the performance of well personnel in collecting samples by monitoring the time it takes after the indication that the sample should be collected.

During oil and gas well drilling operations it is of interest to determine the formation characteristics such as permeability as the drilling operation progresses. In Daniel E. Boone U.S. Pat. No. 4,961,343 describes a system for determining permeability. Boone monitors the volume of hydrocarbon gas pressure in the return drilling fluid to obtain the percentage of gas saturation in the formation. The rate of penetration of the drill bit is monitored. A pore saturation function is derived wherein anomalously low values thereof relative to expected values for productive zones indicate flushing ahead of the drill bit of hydrocarbons out of the pore volume of cuttings in the return fluid. A mud filtrate flow rate is then determined from the drilling rate, gas saturation, and formation porosity. Pressure differential in the vicinity of the drill bit is also determined, comprised of the difference between the drilling fluid column pressure and pore pressure. Formation permeability is then directly determined in real time during the drilling operation from a functional relationship between the filtrate flow rate, pressure differential and viscosity of the drilling fluid. Boone of course is interested in a more narrow view of the geological and hydrocarbon characteristics of the well being drilled.

It has become increasingly desirable for real time and historical logging data to be generated in a form such that it can be conveniently correlated to provide information not easily obtained by mere comparative visual inspections. Boone and Gunther provide only partial solutions to fulfilling these needs of the industry.

SUMMARY OF THE INVENTION

According to the present invention, a portion of the computer operated system referred to as a microprocessor continually monitors parameters necessary to determine the real time status of drilling operations through the use of various magnetic proximity switches, air pressure switches or electrical switches and transduces, all of which provide real time data such as drilling depth, weight on bit at any given time, and also monitors lag time data from various parameters using similar sensors such as mud pump strokes, mud pump pressure, mud pit volume totalizer, return line flow of mud from the well. These data are then converted as required into digital format and are presented to the central processing unit as real time curve data and lag time data.

The microprocessor may also measure preselected properties of mud reaching the surface which relate to the conditions at the depth the mud was injected into the well. These characteristics would be such as the total gas content and constituent gas concentrations for the five gases usually measured, i.e. methane, ethane, propane, butane and isobutane. In addition, $CO_2$ may be monitored. These data are obtained through the hot wire or other technique for detecting the gases of interest. These data are also part of the lag time data and are transferred to the central processing unit. In addition to the real time curve data and the lag time data, inputs to the central processing unit include such things as lithology interpretations, user comments, etc.

The system automatically computes the actual weight on bit while drilling is in progress and this digital value is obtained for every foot drilled, by use of a transducer connected to the drilling rig string. The rate of penetration determined by a geolograph or other proximity switch means and weight on bit are compared and displayed together lending correlation between drill bit wear and actual rock porosity encountered during drilling. The system also provides a total vertical depth or azimuth or inclination versus a measured depth of a bore hole while drilling in order to compute the actual direction of the bore hole that is being drilled and generates a geological-hydrocarbon log graphically reflecting the bore hole direction movement with the overall display of the geological-hydrocarbon log.

The real time data and the lag time data are automatically correlated and merged by the computer system for each increment of depth selected, such as every foot, on a continuous basis as drilling progresses. The computer system provides for an automatic or user input scale values for graphics by checking for the maximum values of the data. The system normalizes data based on the scale values for generating the geological-hydrocarbon log. The computer system then creates a rock file which correlates the data, both lag and real time, written comments (on drilling operations) the percent oil cut, the lithology interpretations and the percent fluor. The rock file is used by graphics display system to make a rock plot and to display on a monitor screen.

The system automatically provides for the occurrence of preselected alarms which alert personnel of the achievement of predetermined data values for any category of data being captured on the drilling rig while drilling, for example, the achievement of a 10 foot increment of penetration, as well as, an event alarm which alert personnel to the occurrence of an event that was not preselected, such as a break alarm when the rate of penetration of the drill bit increases at a predetermined amount, or a sudden increase in mud pressure indicating mud circulation problem.

Thus it can be seen that the overall system takes real time data and lag data and automatically correlates and merges these data for each foot of depth. The system then combines these data with commentary into a format that can be graphically printed using a printer interface to a computer and the resulting geological-hydrocarbon log contains data on the amount of gas along with a lithology, description of rock formations and related drilling parameters that affect economic considerations of the successful completion of the well being drilled. The data can be conveniently processed and sent to a monitor for use on the drilling rig and a printout of the log automatically prepared every 100 foot increment traversed by the drill, or at such other convenient interval.

The system is further capable of taking the 100 foot increments or intervals and stringing them together to provide a total log from the initial spudding in of the well down to the last increment processed.

THE DRAWINGS

In the drawings, which illustrate the best mode presently contemplated for carrying out the invention are as follows:

FIG. 1. Is a block diagram showing the overall system of the invention;

FIG. 2. Is a block diagram illustrating the functions carried out by the central processing unit;

FIG. 3. Is a segment of a geological-hydrocarbon log illustrating the heading for the plot and all the symbolism thereof, including the scale ROP 5 and WOB 100, as well as the gas analysis from 0-200 and a scale change to 400;

FIG. 4. Illustrates another segment of the geological-hydrocarbon log where the WOB scale has been changed to 100, the user notation "ST-1" occurs and comments that the sample line is plugged and the gas lines are frozen;

FIG 5. Is similar to the other Figs showing still another segment of the geological-hydrocarbon log with a comment "unplugged gas line" and "frozen gas line";

FIG. 6. Illustrates still another segment of the geological-hydrocarbon log which notes a lag of 48 minutes at 5635 strokes and at −5500 feet, illustrates a trip for the bit;

FIG. 7. Is similar to the other Figs illustrating still another segment of the geological-hydrocarbon log having the notation of "FM gas", also a date at which −6710 foot depth was reached; and FIG 8. Is similar to the other Figs illustrating still another segment of the geological-hydrocarbon log and has a notation of "begin mud up".

DETAILED DESCRIPTION OF THE PREFERRED EMBODIMENT

Figure 1:
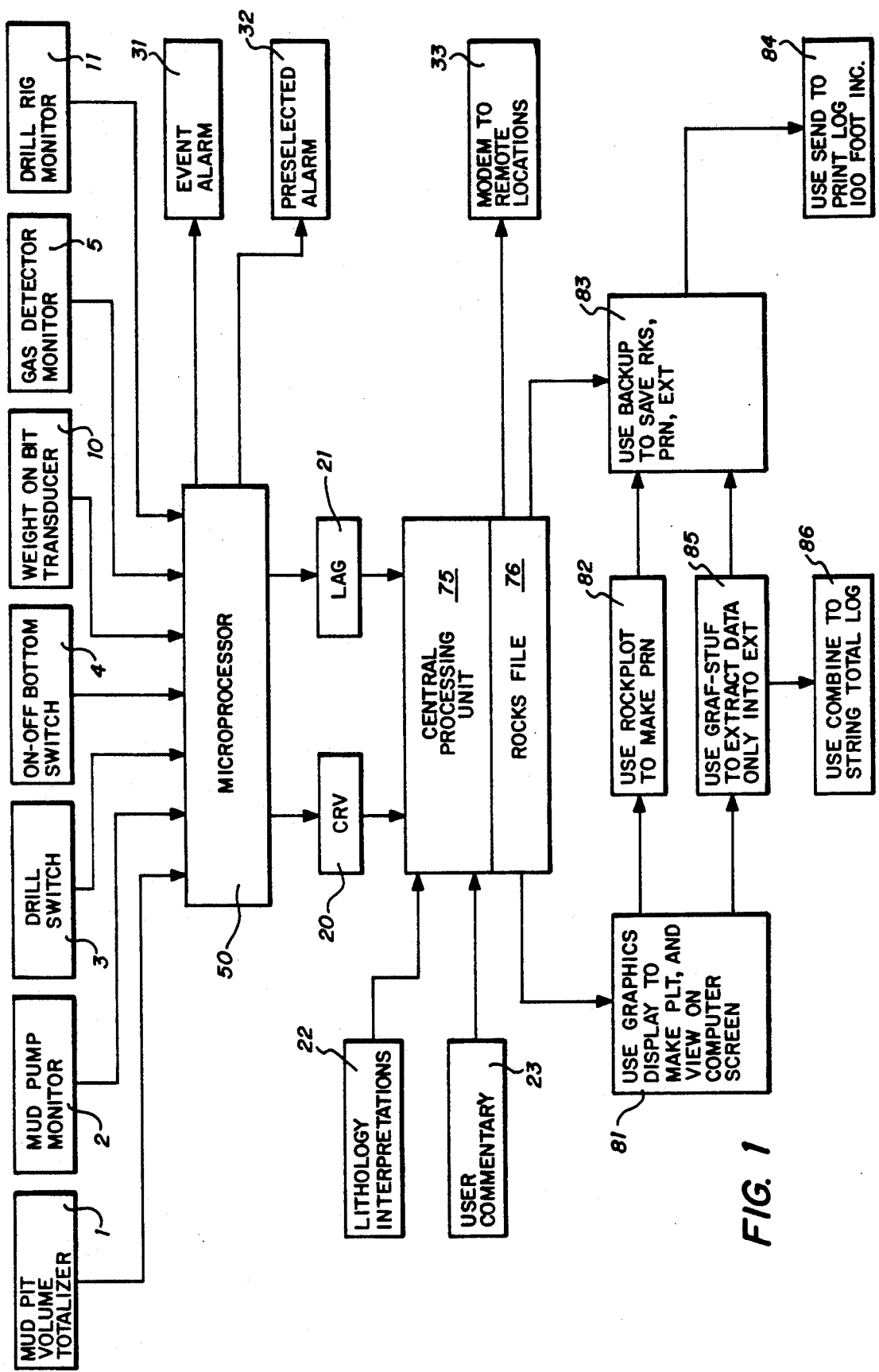

Referring now to the drawings, FIG. 1. is a block diagram of the system for generating the geological-hydrocarbon log and monitoring certain desired events during drilling operation. A microprocessor 50 is provided which is capable of converting analog information into digital information and in the particular microprocessor being used it can handle up to 12 channels of analog data for conversion to digital data, such as an IBM XT. Also the microprocessor 50 converts digital data into columns of textual data in the ASCI II format. In the particular system involved, the data output, which is obtained on a real time basis is illustrated at 20 and referred to as CRV, while data which is obtained after a delay for reasons hereinafter specified is referred to as LAG data and is illustrated at 21. The inputs to the microprocessor 50 include a mud pit volume totalizer 1 (or simply referred to as PVT), a mud pump monitor 2 which will be discussed in more detail, a drill switch 3, an on-off bottom switch 4, gas monitor 5 which may be a hot wire unit or other gas detection and measuring means, a weight on transducer bit 10, and a drill rig monitor 11, which may include depth recorder data, steering tool data, directional drilling, revolutions per minute of the rotary table, etc.

As previously referred to in well drilling operations, drilling fluid generally referred to as drilling mud is pumped during drilling operations down through the drill stem and into the region of the bottom of the well around the drill bit. The fluid of course lubricates the drill bit, picks up drill cuttings cut by the drill bit along with formation gas released by the drilling and is pushed to the surface of the well with drill cuttings and formation gases entrained therein by the additional mud being pumped down the well. The upward flow of the mud is through the well bore outside the drill stem.

Mud pits which now generally take the form of measuring tanks may be monitored by various techniques. For example, a magnetic proximity switch or switches may be positioned to obtain a signal at different levels in the measuring tanks to determine the level and hence, by mathematic calculations, the volume of the mud in the mud pit or measuring tanks. Also a pneumatic back pressure arrangement can be provided that would include a stainless steel tube immersed to a specific level in the measuring tanks. These tubes would be interconnected to a pressure transducer remote from the measuring tanks and as part of the computer controlled system. The system would be programmed to periodically recalibrate the pressure transducer, and with the measuring constants stored in the system, the volume of the fluid in the mud pits is readily determined. Typically the mud pits or measuring tanks would be filled with sufficient drilling fluid to conduct the drilling operations (perhaps in the range of 580 barrels of drilling fluid). The PVT 1 monitors the total volume of the drilling fluid in these pits to determine a sudden volume change indicating a sudden washout, cave-in, formation pressure increase or other change which would cause such a sudden increase or decrease in mud pit volume.

In order to determine at what depth particular drill cuttings and formation gas entrained in the mud were encountered, it is necessary to determine the travel time for the mud to reach the surface with the entrained drill cuttings and the gas from the formation. In the mud pump monitor 2, a proximity switch is used to count the number of mud pump strokes. The number of mud pump strokes used in displacing the hole volume of mud (or lag strokes) is utilized to establish the lag time (in lag strokes per foot drilled) for drill bit cuttings and formation gas entrained in the mud to reach the surface in order that a sample which is taken can be correlated to the depth of the well from which the cuttings and entrained formation gas came. The system uses a fixed constant (lag denominator) with the computer dividing the constant (in feet per stroke of the mud pump achieved at the depth at which the initial lag stroke was calculated) into the depth and automatically adjusting and updating the new value for lag strokes which categorize lag gas values recorded. The mud pump monitor also includes a pressure transducer which determines the mud pump pressure which is normally connected to the stand pipe of a drilling rig and provides a pressure indication when each foot of depth is achieved. This transducer also measures sign waves of fluid movement indicating pump strokes which are used in computing lag data with a predetermined number of lag strokes. Once the number of lag strokes for displacing the total volume of the hole has been determined, the number of strokes on the total stroke counter is assigned to a particular depth (for example 5,000 feet) at which time the lag stroke counter would show a lesser number of strokes (for example 2,000 less strokes) which represents the lag time in terms of lag strokes necessary for the mud at the particular depth (5,000 feet) to reach the surface.

Periodically, the lag time is physically checked, perhaps every 24 hours or 500 feet drilled. To do this, a foreign substance (or oats) is placed in the mud pumped down a well and its reappearance is correlated with the number of mud pump strokes elapsed. One way in which this is accomplished is to use a carbide marker which consists of a pack of carbide granules in a material which dissolves in the drilling mud. The pack is placed in the mud and the material gradually dissolves releasing the carbide into the mud. The carbide reacts with the mud to produce acetylene which is detected in the mud reaching the surface as propane. Thus when the gas detection equipment detects a sudden increase in propane, it indicates that a carbide marker has reached the surface and the bore hole volume has been displaced. The number of lag strokes is recorded and checked with counter and adjusted.

Samples of the entrained formation gas as brought up in the mud are collected with the usual gas trap at the surface and are handled in the normal manner with gas pumps and dilution valves as necessary and sent to gas detection and measuring equipment as indicated at block 5 which typically will measure the total gas (hot wire measuring equipment) along with the concentration of five selected component gases (gas chromatograph). The present invention for purposes of plotting the gas analysis in FIGS. 3. through 8. utilizes the hot wire detection of total gas and allocates these units to C-1, C-2, C-3, C-4 and C-5 base on a constant percentage obtained from initial Chromatography readings. However, the actual components of the total gas may be obtained directly from the chromatograph. The system may also include carbon dioxide, hydrogen sulfide, etc., gas detectors.

The on/off bottom switch 4 may be a pressure or electrical switch to show when a depth recorder on a drilling rig is engaged or disengaged or otherwise on bottom or off bottom allowing the system to determine whether the drilling is active or not. Also a drill switch 3 is provided located on the drilling rig floor for signalling by the operator when the rig is actually drilling. Such information is correlated with other data generated during actual drilling operation. The depth recorder, which is part of the drilling monitor 11, provides data to the computer for determining the total vertical depths or azimuth and inclination of the well versus the length of the bore hole or measured depth of a bore hole. Such measurement while drilling (MWD) provides data to the computer which is used to generate a geological-hydrocarbon log graphically reflecting bore hole directional movement with the overall display of the log turned from a norm to reflect the directional change (not illustrated).

The drill rig monitor 11 also includes a proximity switch for obtaining or measuring the rate of penetration of the drill bit movement while cutting rock. The rate of penetration is measured as a rate of minutes per foot. In addition the weight on the bit transducer 10 is connected to the drilling rig string (not shown) indicating hook load which is the amount of lifting or pull back done by the drilling rig to lessen the weight on the bit while drilling. With this information and the known total string weight (e.g. the bit, the drill string, the traveling block, the Kelly, etc.), the actual value of the weight on bit while drilling is determined by difference for every foot of depth drilled. The total string weight is determined from information available to the driller on the string weight. As previously stated, these inputs to the microprocessor 50 are converted to digital information as required and the output of the microprocessor 50 of the real time data 20 and the lag time data 21 are in a textual format of ASCI II. The information may be stored in the memory of the computer or on discs or both.

The microprocessor 50 has an output 31 denoted as an event alarm which on the occurrence of an event such as the encountering of a high porosity area where oil and gas would be expected or a salt dome or a water source would be detected. The microprocessor 50 also has an output indicated in block 32 which is a preselected alarm for certain conditions such as the reaching of a certain level in the drilling operation or a signal that a particular data value was obtained or that mud sample need to be taken. Such alarms may be audible and visual. Thus the event alarm and the preselected alarm may be directly connected to the drilling rig or transmitted through a modem 33. Thus the microprocessor 50 portion of the system can provide ongoing real time operational information which may require immediate responses by the drilling rig crew. The alarms for convenience are outputs from the microprocessor 50, however, the alarms may also be sent to the central processing unit 75 for transfer to remote locations by the modem 33. The real time data 20 and lag time data 21 are transferred to a central processing unit 75 where lithology interpretations, indicated at block 22, and user comments, indicated at block 23, are processed with the CRV data 20 and the LAG data 21.

The central processing unit 75 has an output which may be coupled to modem 33 to transfer data either from the rock files 76 or from the real time curve data 20 and lag time data 21 files to a remote location, the drilling rig or other locations, where decisions regarding ongoing operations would be made.

The central processing unit 75 creates what is referred to as "rock files" illustrated as 76 of central processing unit 75. The rock files 76 are processable by graphics display software to make a plot and view on a computer screen in the format of a geological-hydrocarbon log as indicated in 81 over a preselected increment of depth (i.e. 100 feet) of the well bore. The rock plot as indicated in block 82 is used to make a print (or PRN) file or print-out which may be backed up as indicated in block for print log 84 which prints a 100 foot increment of the geological-hydrocarbon log of the well bore. In addition, the use "graphics stuff" as indicated in block 85 extracts data only (not header information) from the rock files 76 and as indicated in block 86 use by combine software to string a total log of the 100 foot or other increment printed as indicated by print log at 84. Thus, a continuous log is created without a header for each 100' segment or other preselected segment, as indicated at block 84.

Figure 2:
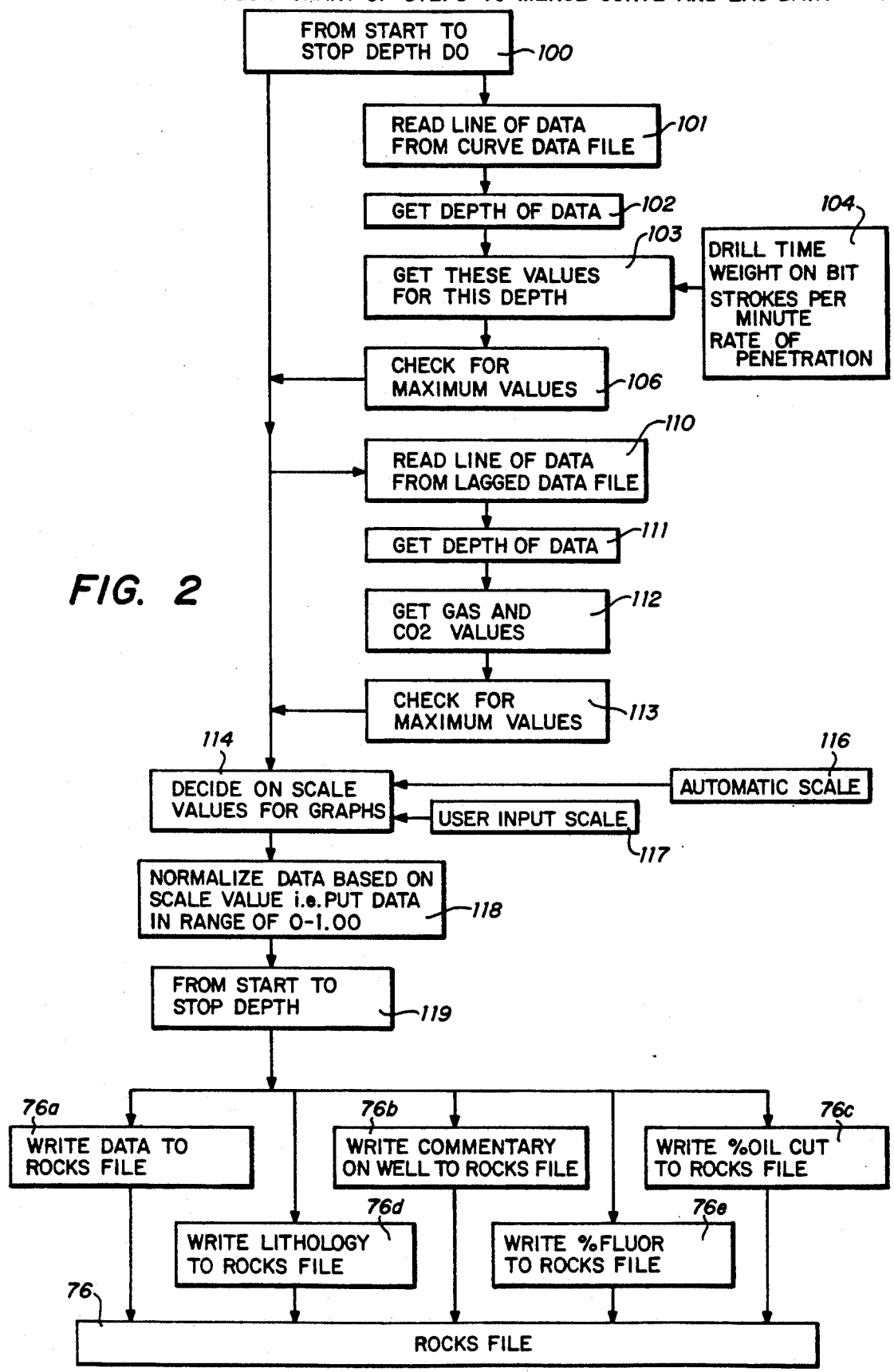

Referring to FIG. 2. there is indicated a flow chart of the steps to merge curve data (CRV) 20 and lag data 21 by the central processing unit 75 (CPU) for the desired depth increment which may be 100 feet or a lesser or a greater depth depending on the particular well and the particular desires of the operator. The CPU 75 reads a line of data 101 from the curve data file 20 and determines the depth of the data 102 and gets values 103 indicated at 104 for the drill time, the weight on bit, the strokes per minute and rate of penetration determined for the depth of the data 102 that is being taken. The system then checks for maximum values 106 and passes these on to be used to determine the scale value 114 for the plots or graphs (for example FIGS. 3. through 8.) that relate to the CRV data file 20. Similarly the system reads a line of data 110 from the lag data file 21, gets the depth data 111 for the depth of the lag data, and obtains the gas and $CO_2$ values 112 for the depth of the data 111 that is being taken. The system checks for maximum values 113 and again sends these on to be used to determine the scale value 114 for these data. The scale value 114 is automatically selected, indicated at 116, but may be input by the user, indicated at 117. Once the scale value 114 has been determined by the system, then the data which has now been combined is normalized based on the scale value, as for example the data is put into the range of 0 to 1.0. The data from the curve data file 20 and the lag data file 21 are taken for each foot throughout the start to stop depth, for example 100 feet, for the particular log being created. Thus, the curve data 20 and lag data 21 are matched for the same depths and merged. The system then stores these data from the start to stop depth 119 in rock files 76 which consist of the merge curve and lag data 76a together with operator comments 76b, the percent of oil cut 76c determined, the lithology 76d of the particular formation rocks and the percent of fluorescence of the formation rocks 76e. The rock files 76 are the data from which the 100 foot increments of the log or other selected increments of the log in block 84 is generated.

Figure 3:
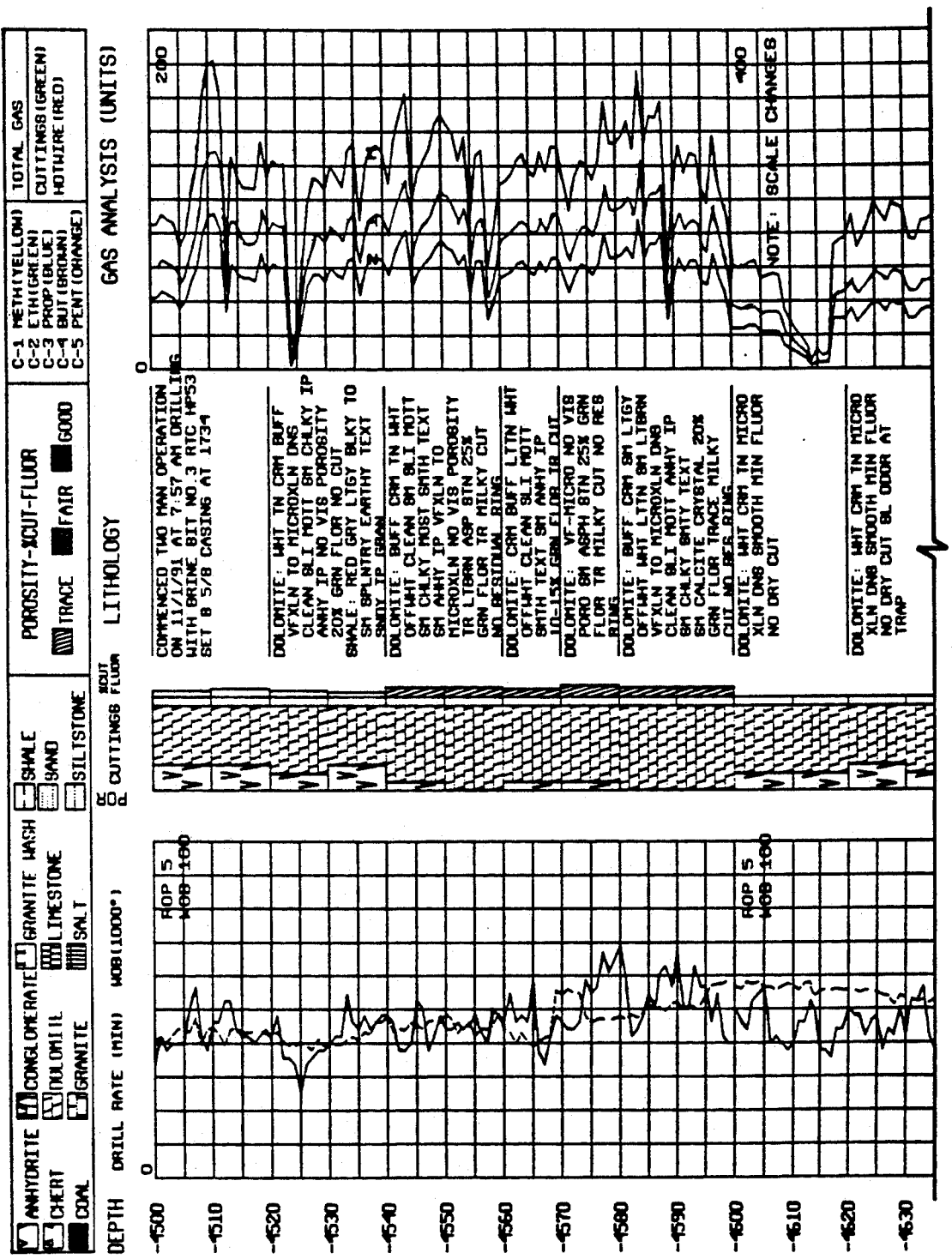
Figure 4:
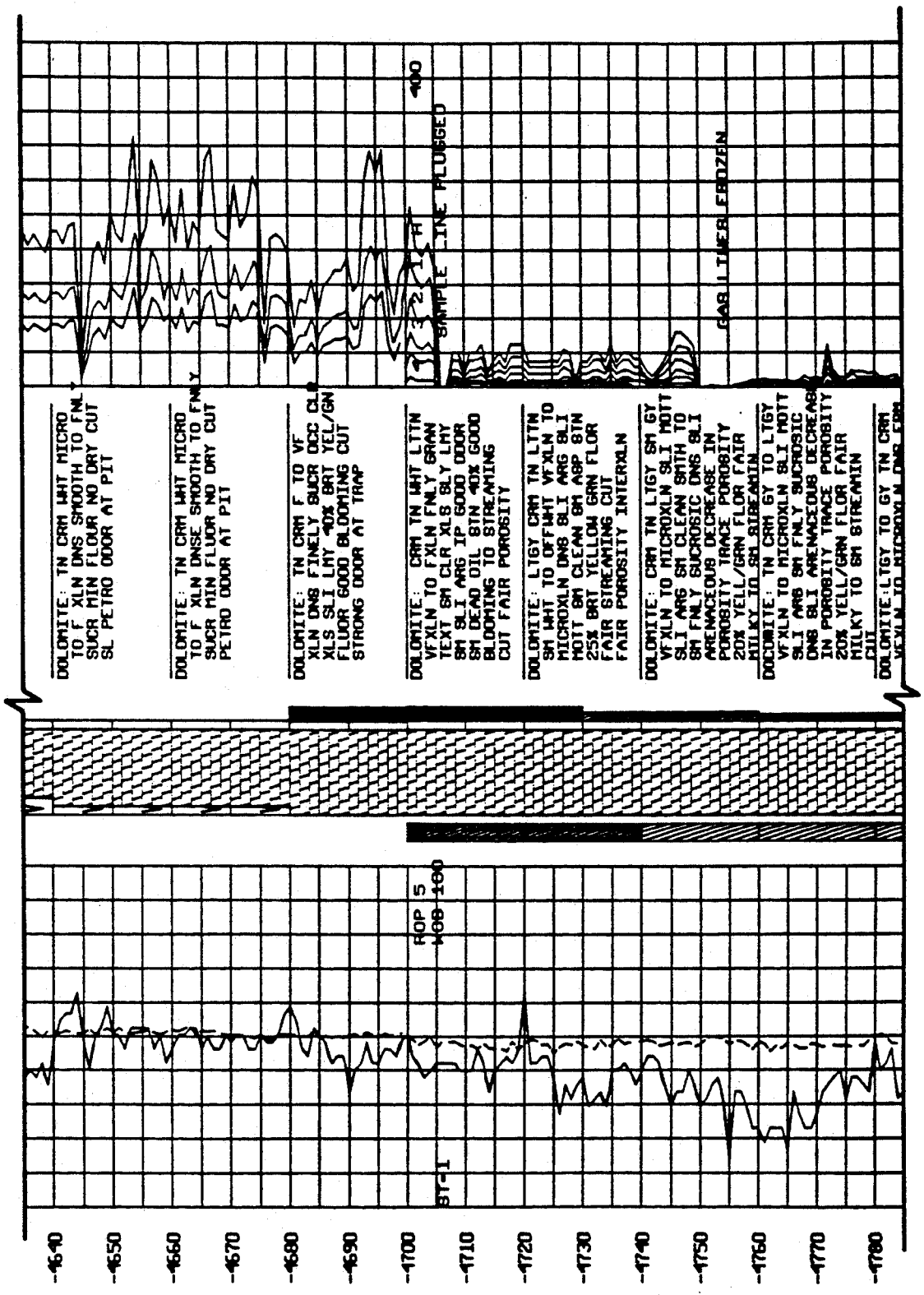
Figure 5:
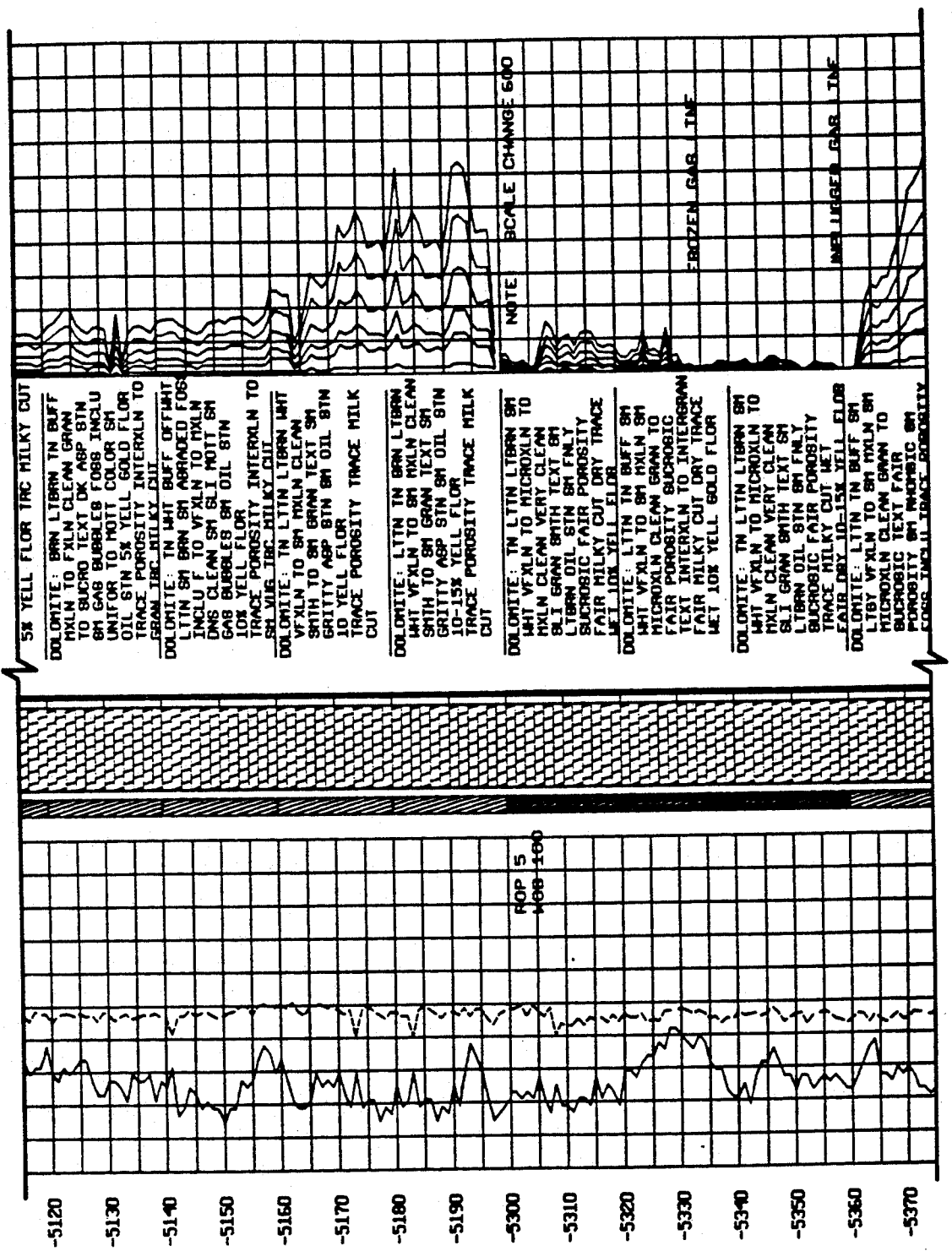
Figure 6:
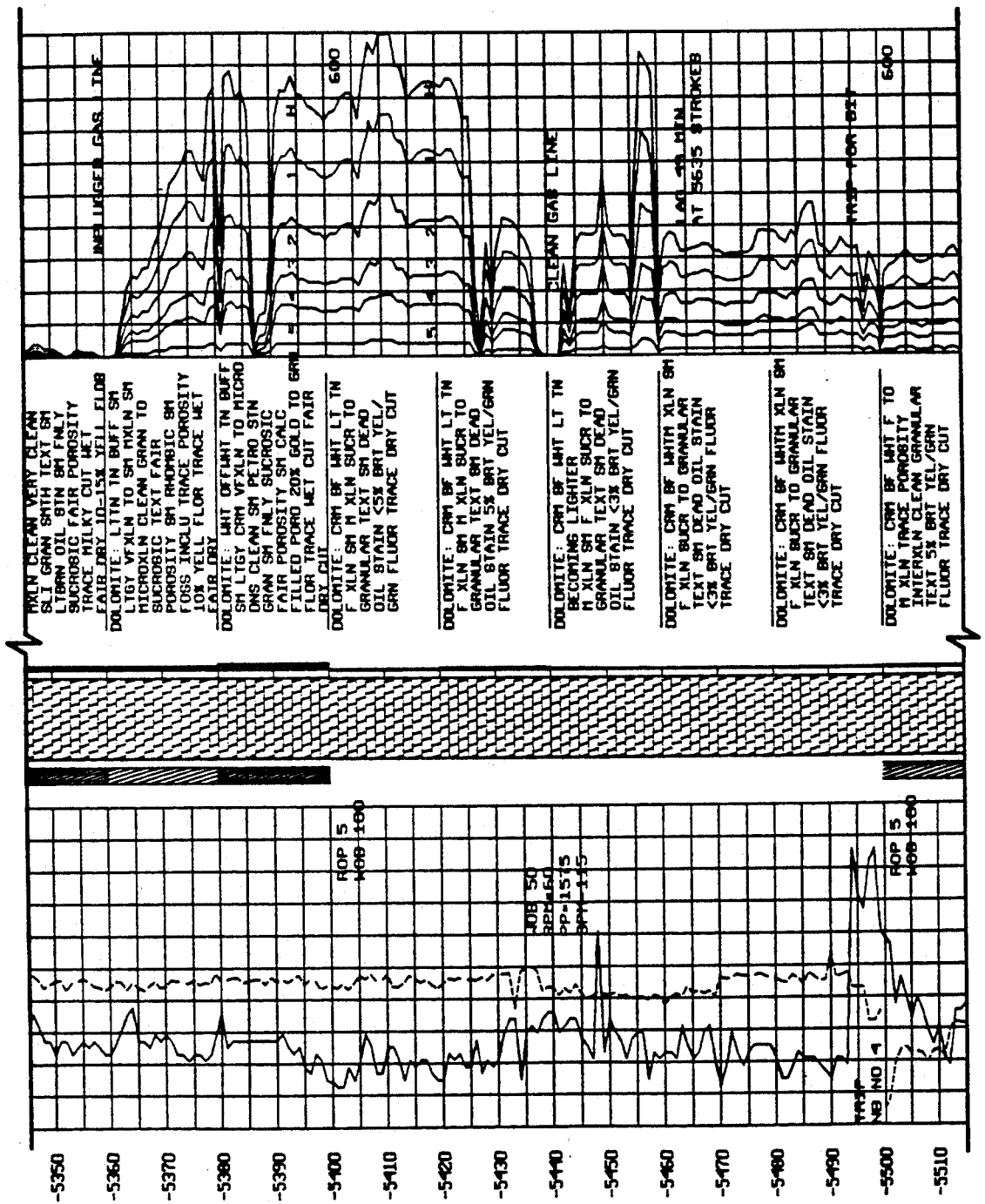
Figure 7:
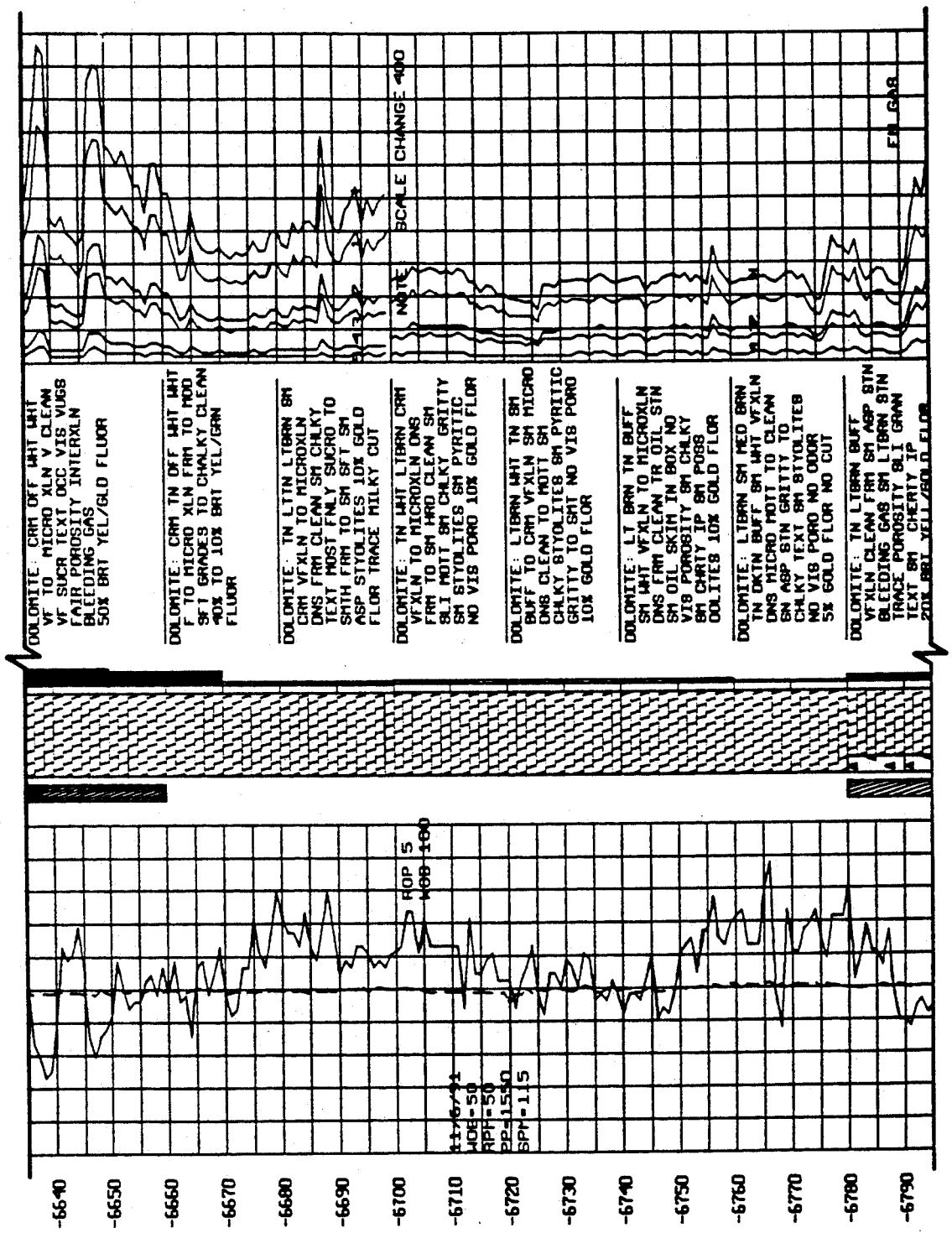
Figure 8:
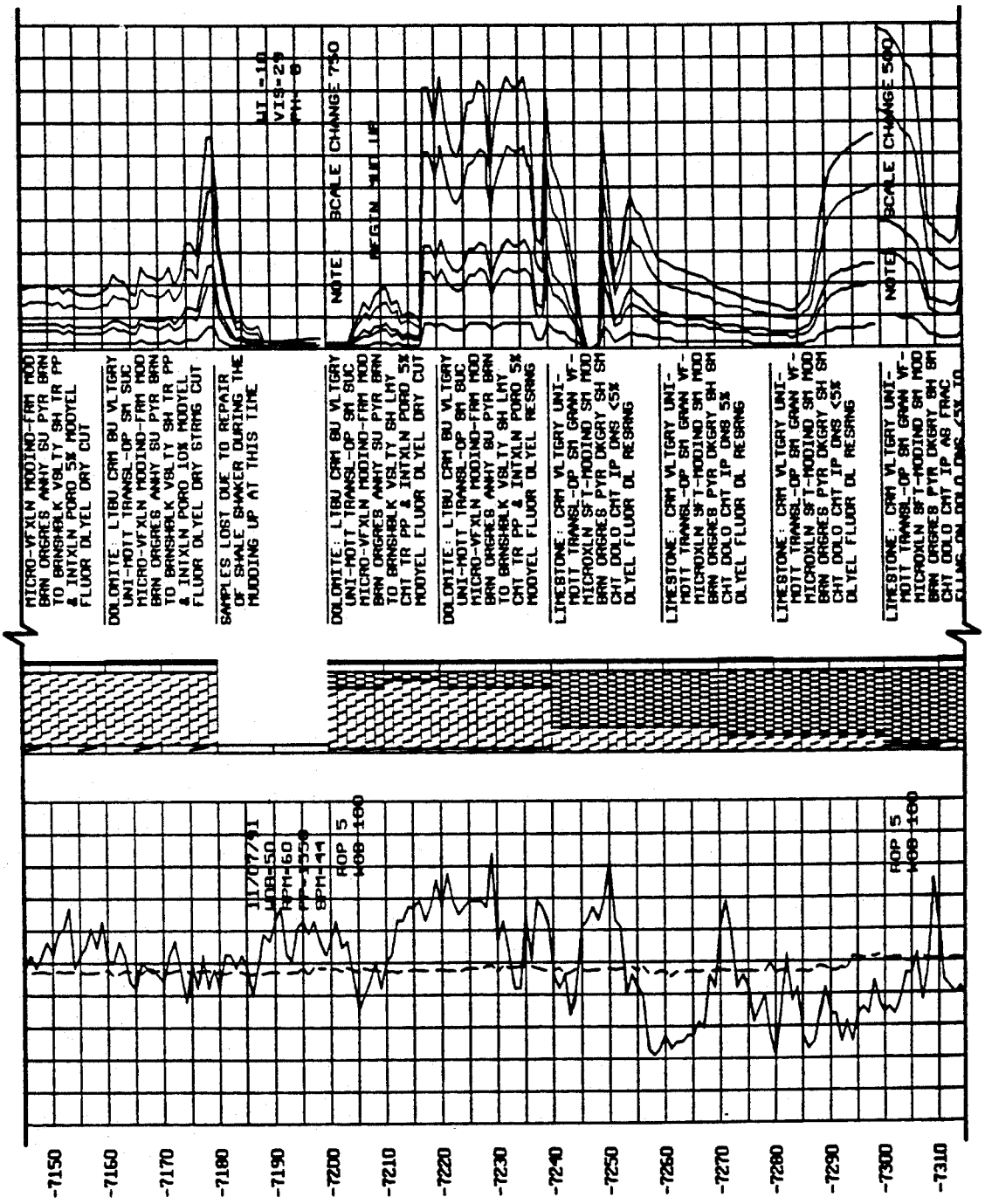

Referring now to FIGS. 3. through 8., a typical plot of a geological-hydrocarbon log of an oil and gas well is illustrated. The logs represented in FIGS. 3. through 8. illustrtate sections of a combined log for the particular well involved which is represented in the block diagram of FIG. 1. at 86. The combined log of 100 foot increments, or such increment as is convenient, would display a heading or header, including a portion not shown, which would identify the geological-hydrocarbon logging service firm and the client company, the well identification, the county, the location of the well, the loggers' names, the intervals being looked at, the date of the log, the unit number, the well number, the field and the state and such other information as would be desirable on a log of this type; as well as a portion that is the legend, shown in FIG. 3., which identifies notations representative of the types of geological formations that might be encountered, the porosity, the percent cut of the fluor or fluorescence and the identification of the gas detected curves, which are illustrated in this particular case as if they were in color in FIG. 3. The legend indicates the scale for the drill rate (ROP) in minutes, the WOB in thousands of pounds and the gas analysis in units. In addition, the particular portion of the log in FIG. 3. indicates that there was a gas analysis scale change to 400 from 200 units at the −5000 foot of well depth and the chart notes that there was such a scale change. There is a description of the lithology for example at the −4520 to −4540 depth. The lithology states that dolomite and shale were encountered, the percent fluor was 25% green fluor, and describes same in the geologist's notations. FIG. 4. further illustrates notations on the plot. It can be observed in FIG. 4. that the porosity from −4700 to −4740 is good while the porosity from −4740 through −4785 is fair. Referring to FIG. 5., the rate of penetration scale is 5 and the weight on bit scale is 100. There is a significant increase between −5320 and −5340 feet in the rate of penetration with a substantially constant weight on bit. Referring to FIG. 6., the rate of penetration and weight on bit scales are indicative that a trip for new bit number 4 was made between the −5490 depth and the −5500 depth. Referring to FIG. 7., a different section of the log is illustrated with the data noted at the −6710 level, weight on bit 50, rpm 50, pump pressure of 1550 and a strokes per minute of 115. Finally FIG. 8. shows similar data at the −7185 foot level with the date, the weight on bit of 50, rpm of 60, pump pressure of 1550 and the strokes per minute at 44. Notes on the gas analysis curves indicate that the scale changed to 750, that the weight of the mud was 10 and the viscosity was 29 with a pH of 8. Also noted in FIG. 8., the comment "begin mud up" which indicates that the mud from the particular level has started its trip to the surface at −7210 depth.

It should be noted that the data particularly the real time data CRV 20 may be provided separate and apart from the lag data 21 to provide information to the drilling rig operators as to the performance of the drilling operation with regard to weight on bit, rate of penetration, the mud pump pressure and sudden changes in the mud pit volume indicative of various problems associated with the drilling operation.

Further, the system provides rapid correlation between the real time data 20 collected and the lag time data 21 as soon as it is made available for the elevation of the real time data 20 desired to be displayed. Thus if it is of interest to view the geological-hydrocarbon log for 100 foot segment such as from −7000 to −7100 and the lag time was 30 minutes for obtaining the lithology, gas analysis and the porosity, type of cuttings and percent cut of fluor, the real time data would be only 30 minutes old plus the time to analyze the lag data which took 30 minutes to reach the surface from the depths of interest. Drill rate in minutes or rate of penetration may be displayed on the plot as opposed to rpm of the drill table and the stroke per minute of the mud pump.

The invention has been illustrated and described with specific reference to an embodiment thereof presently believed to be the best mode of carrying out such invention in actual practice, however it is understood that various changes may be made in adapting the invention to different embodiments without departing from the inventive concepts disclosed herein and comprehended by the claims that follow.

What is claimed is:

1. A method for processing and displaying well logging data during drilling operations of a well bore utilizing a rotary drilling rig and ancillary drilling fluid equipment comprising:

a. Deriving and recording real time data for each preselected increment of depth drilling including the depth of the well, weight on the drill bit, rate of penetration, drill string revolutions per minute, non-drilling time, mud pit volume changes, mud pump strokes, mud pump pressure and percent of fluid flow exiting the well bore;

b. Deriving and recording lag time data for each said preselected increment of depth drilled including formation gas components and formation lithology samples entrained in the drilling fluid;

c. Deriving and recording for each said preselected increment of depth drilled lithology data from said formation lithology samples entrained in the drilling fluid;

d. Recording for each said preselected increment of depth drilled percent of fluorescence for said formation lithology samples;

e. Recording for each said preselected increment of depth drilled percent of oil cut in said formation lithology samples;

f. Recording comments on the drilling operations;

g. Selecting a multiple number of each said preselected increment of depth in an oil and gas well being drilled for plotting a geological-hydrocarbon log;

h. Recalling previously recorded real time data correlated to said multiple number of each said preselected increment of depth for plotting said log;

i. Recalling previously recorded lag time data correlated to said multiple number of each said preselected increment of depth for plotting said log;

j. Recalling the lithology data, the percent of fluorescence, the percent of oil cut related to said formation lithology samples for said multiple number of each said preselected increment of depth for plotting said log;

k. Recalling previously recorded comments on drilling operations for said multiple number of each said preselected increment of depth for plotting said log;

l. Determining the maximum values for said real time data and said lag time data for said multiple number of each said preselected increment of depth for plotting said log;

m. Merging said real time data and said lag time data for said multiple number of each said preselected increment of depth for plotting said log;

n. Selecting the scale interval values for assignment to the merged data based on said maximum values thereof;

o. Normalizing the merged data for presentation with said scale interval values; and p. Plotting the merged data, the recalled lithology data, percent of fluorescence, the percent oil cut, and the recalled comments for the preselected increment of depth as a display on a computer screen or as a print-out.

2. The method of claim 1 wherein a discernable alarm is activated on the occurrence of a preselected event being achieved while drilling said well bore.

3. The method of claim 1 wherein a discernable alarm is activated on the occurrence of an unselected real time event while drilling said well bore.

4. The method of claim 1 wherein said real time data and said lag time data are derived and recorded for each one foot increment of well bore drilled.

5. The method of claim 1 wherein said lag time data is correlated to the real time data by determining the number of lag strokes required to displace the volume of the well bore.

6. The method of claim 1 wherein said real time data and said lag time data are recorded as textual columns of data in ASCI II format.

7. The method of generating a geological-hydrocarbon log of a well bore during drilling operations utilizing a drilling rig, drilling fluid and associated equipment comprising:

a. Deriving and recording real time data while drilling indicative of the actual weight on the drill bit, the rate of penetration of the well bore, the mud pump pressure, and changes in mud pit volume;

b. Deriving and recording lag time data while drilling indicative of the formation gas analysis and formation lithology;

c. Checking said real time data and said lag time data for maximum values thereof;

d. Selecting scale interval values based on said maximum values;

e. Normalizing said real time data and said lag time data for presentation utilizing said scale interval values selected;

f. Merging said real time data and said lag time data recorded for an increment of the well bore depth of interest; and g. Plotting said merged data on a visual display media as a geological-hydrocarbon log.

8. The method of claim 7 wherein commentary on drilling operations is added to the merged data and displayed as part of the geological-hydrocarbon log for the particular depth to which it relates.

9. The method of claim 7 wherein said real time data and lag time data are processed into textual ASCI II files and recorded.

10. System for generating a geological-hydrocarbon log of a well bore during drilling operations with a rotary drilling rig and associated equipment comprising:

a. First monitor means for obtaining at preselected increments of depth drilled real time data including:
  (i) the depth drilled,
  (ii) the weight on the drill bit,
  (iii) rate of penetration,
  (iv) drill string revolutions per minute,
  (v) non-drilling time,
  (vi) mud pit volume changes,
  (vii) mud pump strokes;
  (viii) mud pump pressure, and
  (ix) percent fluid flow exiting the bore hole;

b. Second monitor means for obtaining at said preselected increments of depth drilled lag time data including formation gas components and formation lithology;

c. First processor means connected to said first monitor means and said second monitor means for transforming data from said first and second monitor means into real time curve data and lag time data, indicative of the well bore and drilling characteristic thereof, respectively;

d. Data storage means for receiving from said first and second monitor means real time curve data and lag time data;

e. Second processor means interconnected with said data storage means for:
  (i) checking said real time data and said lag time data for maximum values thereof,
  (ii) selecting scale interval values for presentation based on said maximum values,
  (iii) normalizing said real time data and said lag time data for presentation utilizing said scale interval values,
  (iv) merging said real time data and said lag time data over said preselected increments of depth drilled, and
  (v) generating a rock data file including said merge data, formation lithology data and commentary on drilling operations over said preselected increments of depth drilled; and f. Visual display means for presentation of said rock data file including said merged data, lithology and commentary on drilling operations over said preselected increments of depth drilled on a visual display media as a geological-hydrocarbon log.

11. The system of claim 9 wherein said first processor means includes means to generate said real time curve data and said lag time data into textual ASCI II files.

12. The system of claim 9 wherein said second processor means includes means for determining the lag time for lag time data to reach the surface from each of the preselected increments by utilizing the number of lag strokes per foot drilled.

* * * * *